United States Patent [19]

Christophorou et al.

[11] 4,257,905
[45] Mar. 24, 1981

[54] GASEOUS INSULATORS FOR HIGH VOLTAGE ELECTRICAL EQUIPMENT

[75] Inventors: Loucas G. Christophorou, Oak Ridge; David R. James; Marshall O. Pace, both of Knoxville; Robert Y. Pai, Concord, all of Tenn.

[73] Assignee: The United States of America as represented by the United States Department of Energy, Washington, D.C.

[21] Appl. No.: 44,787

[22] Filed: May 31, 1979

Related U.S. Application Data

[62] Division of Ser. No. 830,973, Sep. 6, 1977, Pat. No. 4,175,048.

[51] Int. Cl.³ .............................................. H01B 3/56
[52] U.S. Cl. .................................. 252/571; 174/176 F
[58] Field of Search ....................... 252/63, 63.5, 63.7, 252/64, 65, 66, 372; 174/176 F, 25 B

[56] References Cited

U.S. PATENT DOCUMENTS

4,175,048  11/1979  Christophorou et al. ........... 252/63.5

Primary Examiner—Harris A. Pitlick
Attorney, Agent, or Firm—Allen H. Uzzell; Stephen D. Hamel

[57] ABSTRACT

Gaseous insulators comprise compounds having high attachment cross sections for electrons having energies in the 0–1.3 electron volt range. Multi-component gaseous insulators comprise compounds and mixtures having overall high electron attachment cross sections in the 0–1.3 electron volt range and moderating gases having high cross sections for inelastic interactions with electrons of energies 1–4 electron volts. Suitable electron attachment components include hexafluorobutyne, perfluorobutene-2, perfluorocyclobutane, perfluorodimethylcyclobutane, perfluorocyclohexene, perfluoromethylcyclohexane, hexafluorobutadiene, perfluoroheptene-1 and hexafluoroazomethane. Suitable moderating gases include $N_2$, CO, $CO_2$ and $H_2$. The gaseous insulating mixture can also contain $SF_6$, perfluoropropane and perfluorobenzene.

1 Claim, 4 Drawing Figures

GASEOUS INSULATORS FOR HIGH VOLTAGE ELECTRICAL EQUIPMENT

This invention was made in the course of, or under, a contract with the United States Energy Research and Development Administration.

This is a division of application Ser. No. 830,973, filed Sept. 6, 1977, now U.S. Pat. No. 4,175,048, issued Nov. 20, 1979.

BACKGROUND OF THE INVENTION

This invention relates in general to electrical insulation for high voltage apparatus and more specifically to gaseous insulation comprising perfluorocompounds. In the prior art several fluorinated or chlorinated hydrocarbons have been proposed for use as electrical insulation. See, for example, British Pat. Nos. 525,244 and 671,780. In U.S. Pat. No. 2,221,670 to F. S. Cooper, fluoro- and chlorofluoromethanes in admixture with nitrogen are shown to provide electrical insulation. While Cooper theorized that electrical breakdown was in some way related to the attachment of free electrons or loss of energy by inelastic collisions, these mechanisms apparently do not play a role in his selection of gaseous insulation. U.S. Pat. No. 2,989,577 to Berg describes the use of a mixture of $SF_6$ and $F_3CSF_5$. This mixture was shown to be more effective than $SF_6$ under comparable conditions. U.S. Pat. No. 3,154,592 to Hauptschein et al describes the use of $CF_4$, $C_2F_6$ and $C_3F_8$, all saturated perfluorocarbons, as dielectric media. U.S. Pat. No. 3,281,521 to Wilson proposes a mixture of $N_2$, $CCl_2F_2$ and $SF_6$ to provide a composition which has a dielectric strength substantially as high as pure $SF_6$ but having lower cost. It was also proposed that $C_2F_6$ could be added to the mixture instead of $SF_6$. The selection of components was based upon the fact that nitrogen reduced the dielectric strength and $CCl_2F_2$ increased the dielectric strength. $CCl_2F_2$ could not be used alone as a dielectric because of its dew point. There was no showing of any synergistic effects of the gases for preventing discharge, only that certain mixtures comprising a small amount of $CCl_2F_2$ could provide dielectric strength substantially equivalent to $SF_6$ at an economic advantage. U.S. Pat. No. 3,390,091 to Eibeck describes the use of a mixture of $SF_6$ and thiazyltrifluoride. U.S. Pat. No. 3,506,774 to Gard et al proposed the use of perfluorovinylsulphurhexafluoride which could be added to $SF_6$ or $N_2$. U.S. Pat. No. 3,650,955 to Manion describes the use of $c$-$C_4F_8$ and $C_4F_{10}$ an insulating materials.

Though many specific fluorinated compounds have been proposed for use as gaseous insulation material, there appears to be little knowledge in the art as to just what physicochemical properties of a gas or gaseous mixture are important in providing efficient insulation against high voltage discharge; consequently there is little guidance for the selection of alternate materials. In an article by M.S. Naidu et al published in J. Phys. D. (Appl. Phys.) 5, 741—746, 1972, the electrical properties of $c$-$C_4F_8$ and iso-$C_4F_8$ (perfluorobutene-2) are compared. It was postulated that the total electron attachment cross section for iso-$C_4F_8$ was larger than that for $c$-$C_4F_8$ thereby suggesting that the uniform field breakdown strength of $c$-$C_4F_8$ would be substantially lower than that of iso-$C_4F_8$. The double bond was thought to be responsible for the expected difference between the insulative properties of these structural isomers. There was no suggestion, however, of what the role of the double bonds might be in preventing breakdown. It can be seen that the selection of gaseous electrical insulators have heretofore been largely a matter of empirical experimentation; that is, several compounds are screened and the ones showing the highest benefit/cost ratio are then proposed for use.

OBJECTS OF THE INVENTION

It is an object of this invention to provide improved gaseous insulators for use in high voltage equipment.

It is a further object to provide single and multicomponent gaseous insulating materials which have substantially higher breakdown strength compared to $SF_6$, the industry-wide standard.

It is a further object to provide a method for designing improved multicomponent gaseous mixtures for use as gaseous insulators.

It is a further object to provide high voltage apparatus having an improved gaseous insulator.

These and other objects are achieved according to this invention in an improved apparatus comprising a gas-tight casing, spaced electrical elements therein adapted to be subjected to differences of electrical potential, and a gaseous insulator between said elements, said gaseous insulator comprising a compound selected from the group of hexafluorobutyne, perfluorodimethylcyclobutane, perfluorocyclohexene, and hexafluoroazomethane. These or other compounds having electron attachment cross sections such as perfluorobutene-2, perfluorocyclobutane, hexafluorobutadiene, perfluoromethylcyclohexane, and perfluoroheptene-1 can be used as a first component in synergistic admixture with a second component such as $SF_6$,$C_3F_8$,$N_2$,$H_2$,$CO_2$,$CO$ and $C_6F_6$.

DETAILED DESCRIPTION

In furtherance of the objects of this invention, a variety of gases have been tested for resistance to electrostatic discharge in test apparatus having a uniform electric field provided by parallel plane electrodes or a non-uniform electric field provided by either two spherical electrodes or by a spherical electrode and a planar surface electrode. All measurements were made at room temperature and each experiment was performed in a stainless steel chamber with ultrahigh vacuum fittings. The experimental apparatus and technique used for all of the measurements presented herein are more fully described in the publication ORNL/TM-5604 "High Voltage Research (Breakdown Strength of Gaseous and Liquid Insulators)" L. G. Christophorou et al, Oak Ridge National Laboratory, Oak Ridge, TN (September 1976) available from the National Technical Information Service, U. S. Department of Commerce, 5285 Fort Royal Road, Springfield, VA 22161, which is incorporated herein in its entirety by reference. Table 1 presents the relative (to $SF_6$) breakdown strength of some of the gases of this invention as well as some prior art gases, measured according to this invention. The non-uniform field data more closely approximates use conditions. It is seen that the novel insulators, perfluorodimethylcyclobutane, perfluorocyclohexene, and hexafluorobutyne (actually hexafluoro-2-butyne) each demonstrate substantially higher breakdown resistance than $SF_6$, the industrial standard.

Figure 1:
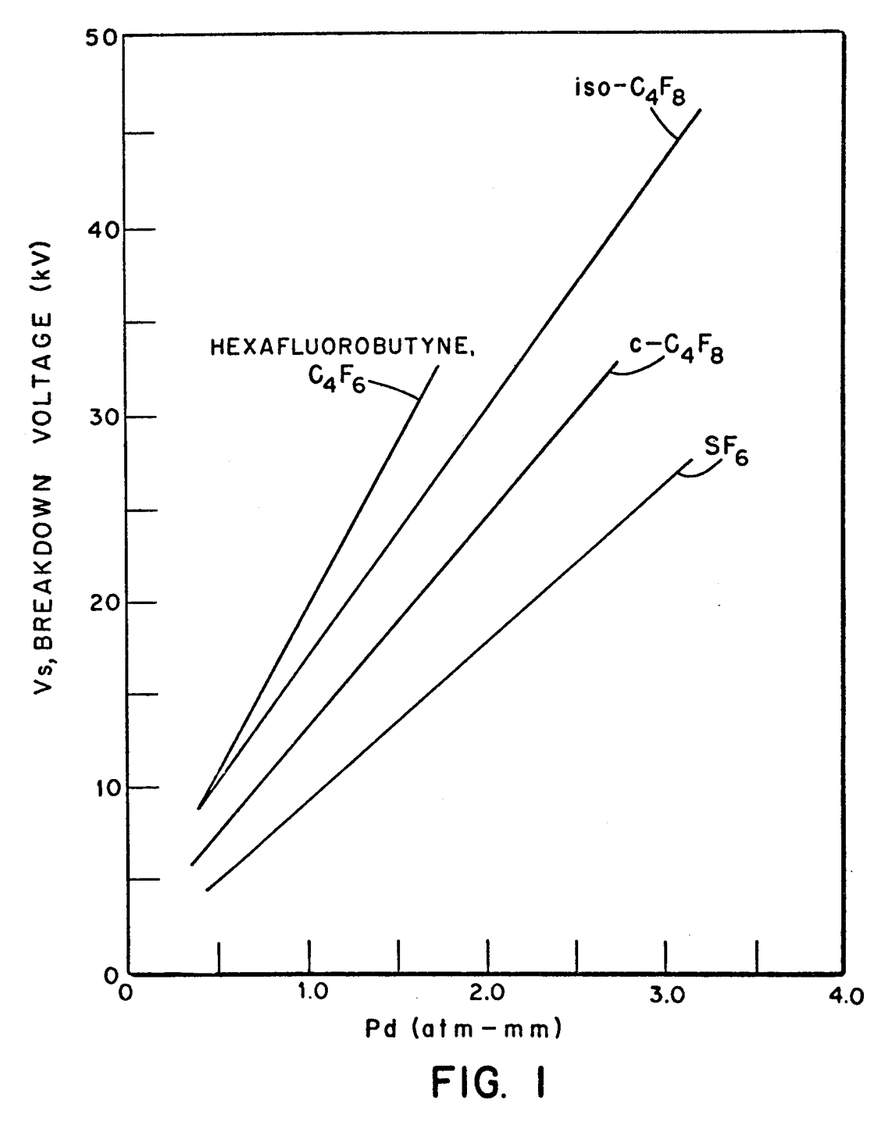
FIG. 1 is a graph showing the relative dielectric strengths of $C_4F_6$ (hexafluoro-2-butyne) and gases proposed in the prior art.

FIG. 1 demonstrates the measured breakdown strength of several perfluorocarbons in comparison with $SF_6$. The breakdown voltage $V_s$ is plotted against Pd, where P is the gas pressure and d is the gap separation between the electrodes. The measurements for various gases were taken at various pressures within the range of 500–2065 torr. The field was provided by a spherical and a planar electrode. Measurements for the fluorocarbon gases were made alternatively between $SF_6$ measurements in order to get an immediate comparison. The plotted lines represent least squares fit to data points. It is seen that $C_4F_6$ (hexafluoro-2-butyne, $F_3C-C\equiv C-CF_3$) had a breakdown strength roughly 2.2 times higher than that of $SF_6$ over the Pd range from about 0.5–1.5 atm-mm. Iso-$C_4F_8$, $F_3CFC=CFCF_3$ had consistently higher breakdown voltages than cyclo-$C_4F_8$, and all three gases had breakdown voltages consistently higher than $SF_6$.

In an effort to explain the observed differences in dielectric properties of the gases, the fundamental interactions of the compounds with electrons were studied. Electrons of particular energies attach themeselves to gaseous molecules forming negative ions. Measurements of the electron attachment rate as a function of mean electron energy were made for various fluorocarbons and for $SF_6$. A general technique for measuring electron attachment rate is described in L. G. Christophorou, Atomic and Molecular Radiation Physics, Wiley Interscience, New York, 1971. The electron attachment cross sections were determined from the measured attachment rates and are presented as a function of electron energy in FIG. 2.

TABLE I

| Relative Breakdown Strengths of Some Unitary Gases | | |
|---|---|---|
| Gas | Relative Strength | |
| $C_4F_6$ (hexafluorobutyne) | 2.1 to 2.2 | high pressure uniform field (plane-plane electrode geometry) |
| iso-$C_4F_8$ (perfluorobutene-2) | 1.7 to 1.8 | |
| c-$C_4F_8$ (perfluorocyclobutane) | 1.3 | |
| $N_2$ (nitrogen) | 0.34 | |
| $SF_6$ (sulfur hexafluoride) | 1.0 | |
| $C_6F_{12}$ (mixture of 1,2- and 1,3-perfluorodimethylcyclobutane) | 2.3 to 2.4 | low pressure non-uniform field (sphere-plane electrode geometry) |
| $C_6F_{10}$ (perfluorocyclohexene) | 1.9 to 2.2 | |
| $C_7F_{14}$ (perfluoromethylcyclohexane) | 2.1 | |
| $C_4F_6$ (hexafluorobutyne) | 1.7 to 1.9 | |
| $C_4F_6$ (hexafluorobutadiene) | 1.4 | |
| $C_7F_{14}$ (perfluoroheptene-1) | 1.2 | |
| $SF_6$ (sulfur hexafluoride) | 1.0 | |

Figure 2:
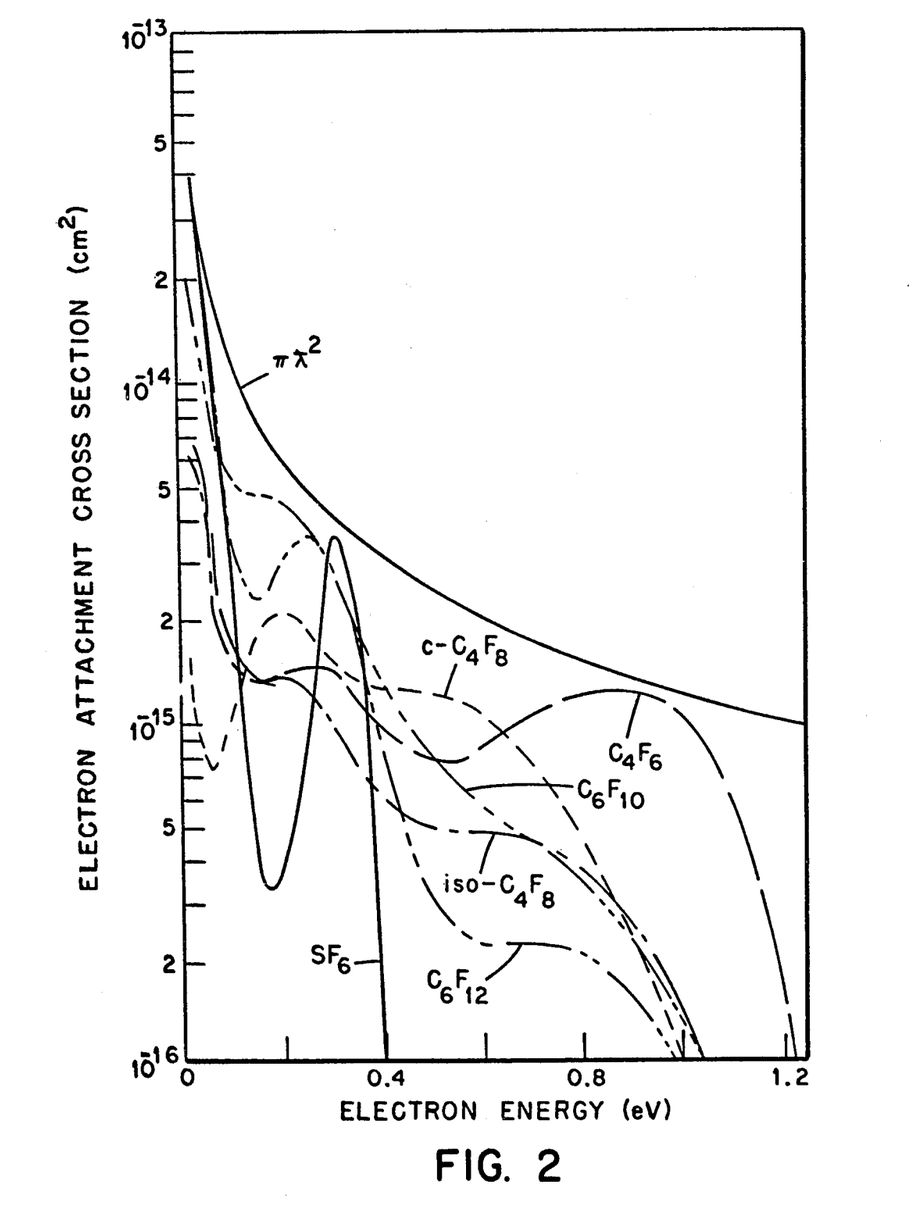
FIG. 2 is a graph showing the electron attachment cross sections of gases of this invention cmpared to $SP_6$,$c$-$C_4F_8$, and iso-$C_4F_8$.

In addition to the compounds of FIG. 1, FIG. 2 contains curves for the novel insulator components $C_6F_{10}$ (perfluorocyclohexene) and $C_6F_{12}$ (a mixture of 1,2 and 1,3 isomers of perfluorodimethylcyclobutane). The $\pi\lambda^2$ curve represents the maximum s-wave capture cross section. The cross section curve for $C_4F_6$ may be as much as 20% in error due to an inability to accurately measure extremely small amounts of this gas; however, the functional dependence on energy is correct and unaffected by this uncertainty.

It can be seen from FIG. 2 that $SF_6$ which had the lowest breakdown voltage has an extremely high attachment cross section but only for electrons in the energy ranges 0 to about 0.10 eV and from 0.2 to about 0.4 eV. The novel fluorocarbons of this invention have attachment cross sections which, though lower in some cases than the maximum $SF_6$ cross section, extend outward up to about 1.3 eV. Of the gases of FIG. 1, $C_4F_6$, which had the highest attachment cross section above 0.4 eV, also had the highest dielectric strength. From a comparison of FIGS. 1 and 2, it is apparent that it is not sufficient that a dielectric gas capture only low energy electrons, less than 0.4 eV in energy. In the discharge process, there are significant numbers of electrons which become accelerated to above 0.4 eV under the influence of the electric field. Accordingly, it has been discovered that gases with high cross sections (> about $10^{-16} cm^2$) for attaching electrons in the energy range above about 0.4 eV are significantly better dielectrics than those such as $SF_6$ which capture only low energy electrons. This discovery is apparently contrary to the approach of prior workers in the field who implicitly or explicitly considered only the thermal electron attachment properties of a gas to be of primary importance in electrical discharge of high voltage apparatus.

Interestingly, c-$C_4F_8$ shows a substantially higher attachment cross section for electrons in the higher energy range than does iso-$C_4F_8$, yet iso-$C_4F_8$ shows a higher breakdown voltage. It was predicted by Naidu et al (above) that iso-$C_4F_8$ would have a higher overall attachment cross section, which is contrary to our results. This apparent anomaly can be explained by the presence of a double bond in iso-$C_4F_8$. Based on data reported for hydrocarbons, see L. G. Christophorou et al., Chem. Phys. Letters 18,509 (1973), we believe that the electrons in the $\pi$ orbitals of the double bond interact efficiently with electrons of energies above 1.5 eV causing them to lose energy. These additional lower energy electrons could then be efficiently attached by iso-$C_4F_8$, thereby resulting in a higher overall breakdown voltage. Not all double bond fluorocarbons are markedly superior to $SF_6$, however. The dielectric strength of $F_3CFC=CF_2$ was only ~9% better than that of $SF_6$, indicating that other molecular phenomena are involved.

Having shown the importance of electron energies above about 0.4 eV in electrical discharge mechanisms, we tested a series of gaseous mixtures to determine the particular contribution of electrons of various energy ranges and thereby dictate desirable gaseous mixtures for absorbing or slowing down these electrons. The breakdown voltages of several gaseous mixtures is shown in Table II. $N_2$ was used as a diluent gas. By eliminating in turn each of the four insulating components, the effect of each on the overall insulating properties of the mixture can be seen. It is shown that $C_4F_6$ (hexafluoro-2-butyne) is extremely effective as an additive. The replacement of 10% $C_4F_6$ by $N_2$ had a dramatic effect on the dielectric strength of the mixture. A decrease of nearly 20% is observed. Furthermore, in mixtures with 10% $C_4F_6$ the dielectric strength of any of the combinations is greater than 90% of the breakdown strength of all combinations of the four insulators with $N_2$. It is seen that cyclo-$C_4F_8$ is not very effective in admixture with the remaining fluorocarbons. Only a very small decrease in breakdown strength is observed when c-$C_4F_8$ is replaced by $N_2$. $C_3F_8$ is about as effective as $SF_6$ as an additive.

Although iso-$C_4F_8$ and c-$C_4F_8$ are stronger dielectrics than $SF_6$, we have found that they do not increase the dielectric strength in low percentage mixtures with $N_2$ as much as does an equal amount of $SF_6$. It is not until a binary mixture contains about 30% iso-$C_4F_8$ and 70% $N_2$ that its breakdown voltage exceeds that of mixtures having a like amount of $SF_6$.

While nitrogen has been proposed in the prior art as a diluent gas (see, for example, U.S. Pat. Nos. 3,281,521 and 3,506,774), its synergistic effects were either unobserved or unexplained. In accordance with this invention it is now possible to get an indication as to whether $N_2$ or other moderating gases demonstrate synergism in admixture with other dielectric gases. If the sum properties of the multicomponent mixture include a high inelastic interaction cross section in the energy range of $\sim 1$–4 eV and a high attachment cross section in the range of $\sim 0$–1.3, there is a large likelihood that the mixture will demonstrate synergism. If the inelastic cross section occurs at lower energy than the attachment cross section, the likelihood for synergism is small. Examples of the latter case appear to be mixtures of $CCl_2F_2$ and $CO_2$ and $SF_6$ and $CO_2$.

TABLE II

Relative Breakdown Strengths of Four-Component Gaseous Mixtures

| $N_2$ | Gaseous Mixture $C_4F_6$ | $SF_6$ | c-$C_4F_8$ | $C_3F_8$ | $\frac{\Delta V_s}{\Delta(Pd)} \left( \frac{kV}{atm - mm} \right)$ | Relative $\frac{\Delta V_s}{\Delta(Pd)}$ |
|---|---|---|---|---|---|---|
| 60% | 10% | 10% | 10% | 10% | 8.42 | 100% |
| 70% | 10% | 10% | — | 10% | 8.28 | 98.3% |
| 70% | 10% | — | 10% | 10% | 7.94 | 94.3% |
| 70% | 10% | 10% | 10% | — | 8.11 | 96.3% |
| 70% | — | 10% | 10% | 10% | 6.88 | 81.7% |

Apparently, a large proportion of $N_2$ moderates the electrons to the lower energies where $SF_6$ has very high attachment cross sections. As less $N_2$ ia added, the electrons are not as effectively moderated, and having a higher average energy, are more efficiently captured by the $C_4F_8$ isomers.

Figure 3:
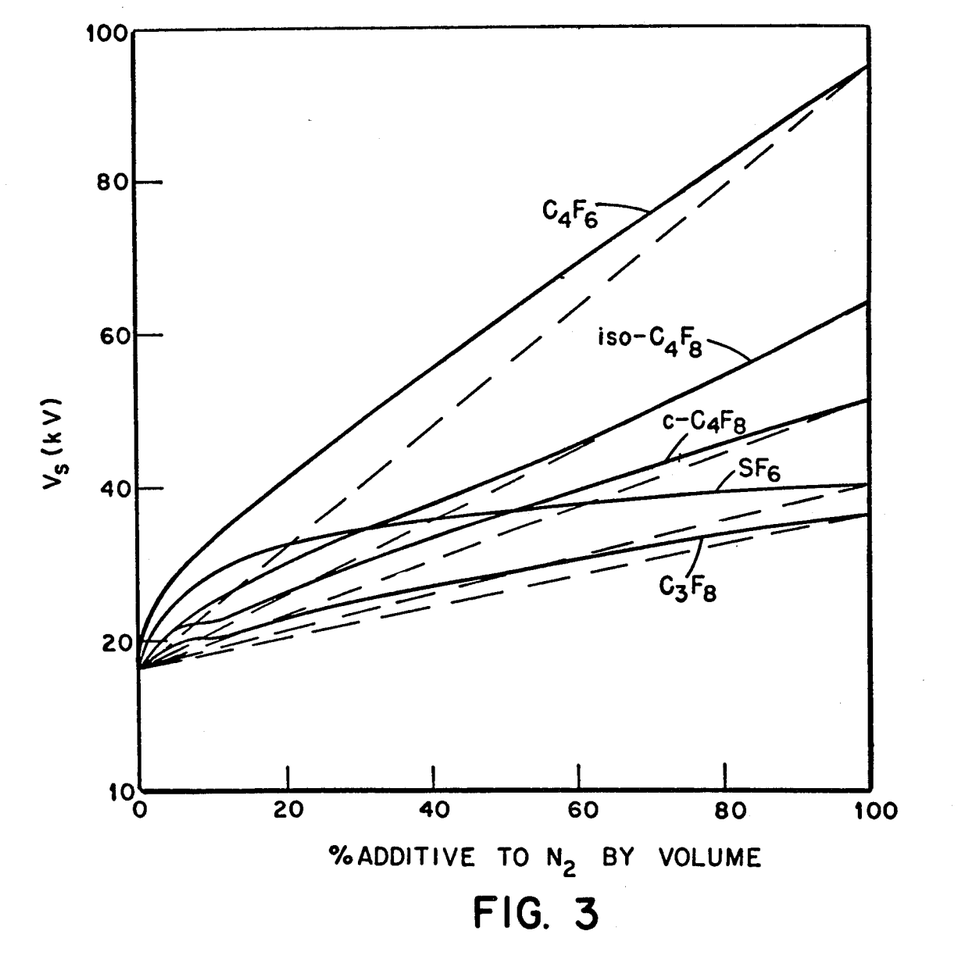
FIG. 3 is a graph showing the breakdown voltages of synergistic mixtures of electron attachment gases and $N_2$.

An additional aspect of this invention is based upon the discovery that gases such as $N_2$, $H_2$, CO and $CO_2$ which interact inelastically with electrons at energy ranges above about 1 eV are highly beneficial as additives for use with gases having high electron attachment cross sections in the 0–1.3 eV range. These inelastic interactions moderate electrons to energies below about 1.3 eV where they are efficiently captured by the attachment gas. The synergistic effect of moderating gases on the insulating properties of the perfluorocarbons of this invention is demonstrated in a series of breakdown measurements (Pd of 4.595 atm-mm) taken on mixtures having various percentages of insulating compounds and nitrogen. These results are depicted in FIG. 3. The cooperative effect of $N_2$ and the insulating compounds is shown by the fact that for all additives the breakdown voltage is larger than the weighted average which would be the breakdown voltage of the mixture if a purely additive relationship existed. This synergism is represented by the distance between the experimental data and the dashed lines drawn from the point of 100% $N_2$ to 100% additive. In all proportions the component gases cooperate synergistically in increasing the breakdown strength of the mixture, the sume effect being greater than the sum of the partial contributions of each component.

It is interesting to note from FIG. 3 that the breakdown strength of mixtures of $SF_6$ and $N_2$ does not increase significantly with greater than 40% $SF_6$ additive. Since the total vapor pressure of the mixtures depicated in FIG. 3 was 500 torr, the 40% component of $SF_6$ would amount to a 200 torr partial pressure. This clearly indicates that the electrons which $SF_6$ is capable of attaching, i.e., those with energies less than about 0.4 eV are practically all attached at a partial pressure of about 200 torr $SF_6$ for the particular gap length and pressure.

According to the discoveries associated with the present invention, insulating mixtures can be prepared from $N_2$, $C_4F_6$ (hexafluorobutyne) and, if desired, $SF_6$ which can have a higher breakdown resistance/cost ratio than $SF_6$. The results of breakdown measurements of various mixtures of these gases are shown in Table III. Also shown for the mixtures is the weighted breakdown voltage which would be expected without the observed synergistic effect. The costs of the gaseous mixtures were based upon assumed cost of 83¢ per cubic foot of $SF_6$, $2.50 per cubic foot for $C_4F_6$ and 0.1¢ per cubic foot for $N_2$ (derived from Electric Power Research Institute, Report No. EPRI 7816 and ERDA E(49-18)-1560 July 1975, also private communication with industrial chemists). In parentheseis are the relative breakdown voltages and costs to those of $SF_6$. It is seen that even at present costs, an 80/20 volume ratio of $N_2$ to $C_4F_6$ provides about the same dielectric strength as $SF_6$ at 60% of the cost. An 80/10/10 mixture of $N_2/SF_6/C_4F_6$ mixture provides almost 88% of the dielectric strength of $SF_6$ for 41% of the cost. Of course, as shown in Table II, $C_3F_8$ can be substituted for $SF_6$, if desired.

TABLE III

Relative Breakdown Strengths of Two- and Three-Component Gaseous Mixtures

| Gaseous Mixture | | | Total Pressure (torr) (1 atm = 760 torr) | $\frac{\Delta V_s}{\Delta(Pd)} \left(\frac{kV}{atm - mm}\right)$ | Predicted $\frac{\Delta V_s}{\Delta(Pd)}$ Absent Synergism $\left(\frac{kV}{atm - mm}\right)$ | Cost ¢/ft.$^3$ |
|---|---|---|---|---|---|---|
| $N_2$ | $C_4F_6$ | $SF_6$ | | | | |
| 100% | — | — | 500 | 2.98 (0.34)* | | 0.1 |
| — | — | 100% | 500 | 8.65 (1)* | | 83 |
| — | 100% | — | 500 | 19.76 (2.28)* | | 250# |
| 90% | 10% | — | 500 | 6.77 (.78)* | 4.66 | 25.1 (.29)* |
| 80% | 20% | — | 500 | 8.71 (1.01)* | 6.34 | 50.1 (.60)* |
| 70% | 30% | — | 500 | 10.18 (1.18)* | 8.014 | 75.1 (.90)* |
| 80% | — | 20% | 500 | 6.53 (.75)* | 4.114 | 16.7 (.20)* |
| 80% | 10% | 10% | 500 | 7.60 (.88)* | 5.225 | 33.38 (.41)* |
| 60% | 20% | 20% | 500 | 9.51 (1.10)* | 7.47 | 66.67 (.81)* |
| 50% | 30% | 20% | 500 | 11.51 (1.33)* | 9.148 | 91.65 (1.10)* |

*Relative to $SF_6$
Estimate based on mass production of $C_4F_6$.

In order to further illustrate the beneficial effect of electron moderating gases in general in admixture with gases having high electron attachment cross sections in the 0.5–1.3 eV range, a series of mixtures of $C_4F_6$ (hexafluoro-2-butyne) and $N_2$, CO and $H_2$ were tested for breakdown strength. Some preliminary data are given in Table IV. Also shown in Table IV for the gaseous mixtures is the breakdown voltage with respect to Pd which would be calculated absent any syergistic effect, based upon the additive contribution of the components. It is seen that for mixtures of $C_4F_6$ in each of the moderating gases, the breakdown voltage is significantly higher for a given Pd than would be expected solely from the additive contributions, clearly demonstrating the importance of mederating properties in these gaseous insulators.

Having demonstrated the high dielectric strength of perfluorocarbons of this invention and the synergistic effect of the moderating gases in combination with perfluorocarbons and $SF_6$, one aspect of our invention lies in an improved gaseous insulator in combination with any apparatus comprising a gas-tight casing containing therein spaced apart electrical elements subject to relative differences in electrical potential. The electrical apparatus may be a transformer, generator, coaxial cable, X-ray tube housing, underground transmission cable, etc. The test apparatus employed in collecting the data of this specification is an example of such a device.

Based upon the discoveries associated with this invention, novel gaseous insulating systems comprise a compound selected from the group of hexafluorobutyne, perfluorodimethylcyclobutane, perfluorocyclohexene, and hexafluoroazomethane. These four gases or other insulating gases having high electron capture cross sections such as perfluorobutene-2, perfluorocyclobutane, hexafluorobutadiene, perfluoromethylcyclohexane, and perfluoroheptene-1 can be used as a first component in synergistic admixture with other gases such as $SF_6, C_3F_8$ and $C_6F_6$ (hexafluorobenzene) which have high attachment cross sections for particular regions of electron energies and in synergistic admixture with gases such as $N_2$, $H_2$ and CO which moderate electrons in the 1 to ~4 eV range.

The optimum mixture of electron attachment gases and moderating gases should be designed to provide a high electron attachment cross section over the entire 0–1.3 eV range, particularly the 0.4–1.3 eV range. As seen in FIG. 2, mixtures of attachment gases can be tailored to provide an overall electron attachment cross section approaching the theoretical $\pi\lambda^2$ values. The moderating gases likewise can be selected to provide a high electron scattering cross section over the 1 to ~4 eV range. Of course, in practice, the costs of various components must be considered as well as the dew point and liquefaction properties of the mixture. Based upon the teachings herein, it is a matter of routine experimentation to determine the proper amounts of each electron attaching component. The percentage of moderating component or components needed to achieve the desired breakdown resistance at minimum cost can likewise be determined by routine experimentation. The preferred mixtures for both physical and economic reasons are mixtures containing at least about 50 vol.% $N_2$, 10–30 vol.% $C_4F_6$ (hexafluoro-2-butyne) and 10–20 vol.% $SF_6$. Examples of these mixtures which have demonstrated good results by volume: 30% $C_4F_6$ (hexafluoro-2-butyne), 20% $SF_6$ and 50% $N_2$; 20% $C_4F_6$ (hexafluoro-2-butyne), 10% $SF_6$, 60% $N_2$ and 10% $C_3F_8$ (perfluoropropane), with 30% $C_4F_6$ (hexafluoro-2-butyne), 20% $SF_6$ and 50% $N_2$ providing the best overall results. It should be noted, however, that perfluorocyclohexene and perfluorodimethylcyclobutane have relatively low vapor pressures at room temperature and would not be suitable in amounts greater than about 10% by partial pressure of the gaseous insulator at a total pressure of about 3–4 atm.

Figure 4:
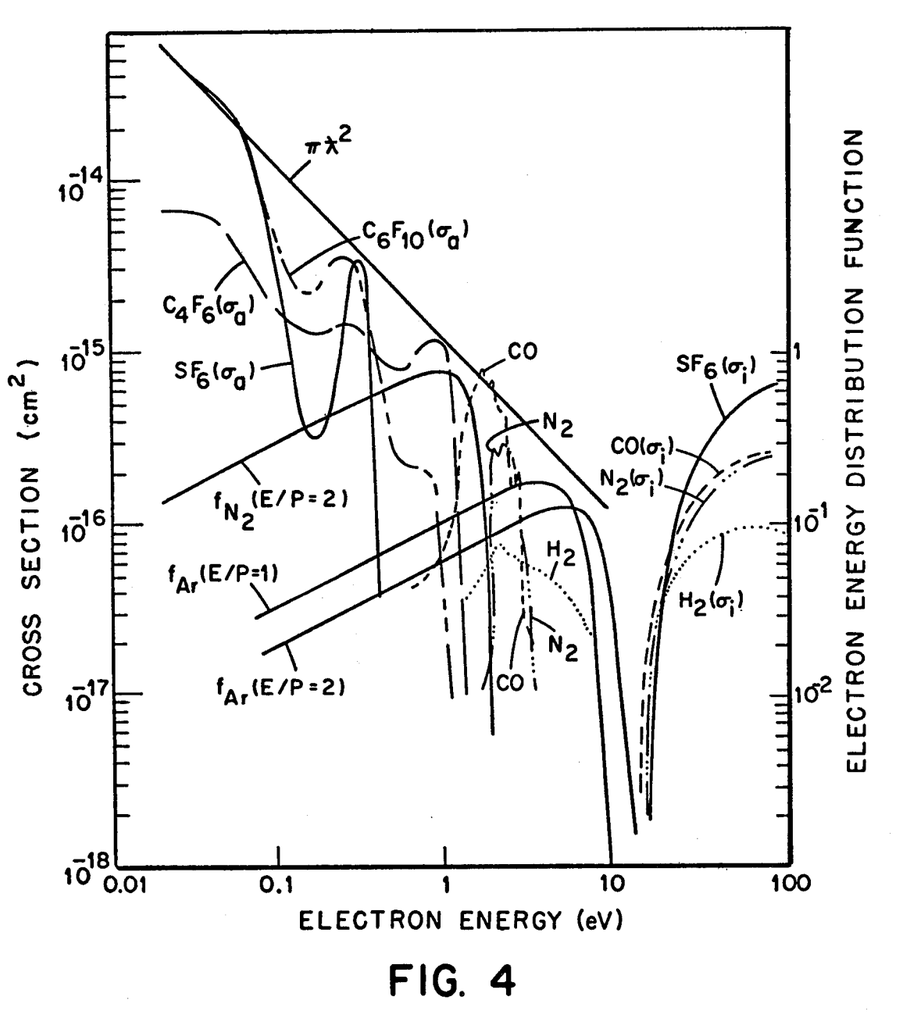
FIG. 4 is a graph showing the electron attachment cross sections, inelastic interaction cross sections, ionization cross sections and electron energy distribution function as functions of electron energy for several gases useful in electrical insulators.

In a gas under an applied electric field free electrons have a distribution f of energies $\epsilon$, which is a function of the gas and the quantity E/P where E is the applied electric field and P is the gas pressure at a given temperature, viz f ($\epsilon$, E/P, Gas). The functions f ($\epsilon$, E/P) are equilibrium energy distributions even for AC fields since the electron relaxation times are quite short under normal operating conditions. As the applied voltage is increased, the electrons gain energy and f ($\epsilon$, E/P) shifts to higher energies. This shift is a strong function of the elastic and inelastic processes which absorb the energy input by the field. For physical reasons, it is unattractive to attempt to capture electrons above ~3 eV. The capture cross sections decrease with increasing energy position of the electron capture cross section resonance. The distributions f($\epsilon$, E/P) are known for only a few gases. In FIG. 4 this function is plotted for $N_2$ at one E/P value and for Ar at 2 E/P values. Depending on the gas and E/P, the function can peak at any energy from thermal to about 10 eV. Knowledge of the electron energy distribution function is necessary for a precise appraisal of the role of microscopic physical knowledge in understanding and in controlling breakdown. The most effective way of preventing electrons from initiating breakdown has now been shown to be the removal of the electrons from the dielectric gas. An effective way of achieving this is to attach the electrons to molecules forming negative ions which being much heavier than the electrons do not have kinetic energies high enough to cause ionization. The unattached electrons can be slowed down and prevented from ionizing the gases and triggering breakdown. These statements can be formalized as the following equations:

$$\int_0^\infty \sigma_a(\epsilon) f(\epsilon, E/P) d\epsilon \longrightarrow \text{maximum} \quad (1)$$

$$\int_I^\infty \sigma_i(\epsilon) f(\epsilon, E/P) d\epsilon \longrightarrow \text{minimum} \quad (2)$$

In equation 1, the electron attachment cross section $\sigma_a$ as a function of $\epsilon, \sigma_a(\epsilon)$, should be as large as possible over as wide an energy range as possible. FIG. 4 also shows examples of $\sigma_a$ for three dielectric gases, $SF_6$, $C_4F_6$ (perfluorobutyne) and $C_6F_{10}$ (perfluorocyclohexene). The curve identified by $\pi\lambda^2$ is the maximum s-wave capture cross section. In order to optimize equation 1, the electron energy distribution function $f(\epsilon, E/P)$ must be shifted to as low energy as possible. In equation 2, the electron impact ionization cross section as a function of electron energy $\sigma_i(\epsilon)$ must be as small as possible and the ionization threshold energy I must be as high as possible. For a given E/P, $f(\epsilon, E/P)$ should again be shifted to as low electron energy as possible in order to optimize equation 2. It is thus seen that the reduction of electron energies is of paramount importance because a lower $f(\epsilon, E/P)$ minimizes equation 2, but also maximizes equation 1. Such a reduction in electron energy requires large cross sections for elastic and inelastic scattering, especially in the sub-excitation range, i.e., the energy range below the first excited electronic state of the medium. The optimum gaseous dielectric is thus envisioned to be not a single gas but rather a combination of gases designed as to components to provide the best effective combination of electron attaching and electron moderating properties. Approximate calculations indicated that only about 1% of the electrons in the medium are at energies below 0.4 eV where $SF_6$ is functional. Also shown in FIG. 4 are the vibration excitation cross sections by the decay of negative ion resonances (NIR) of CO, $N_2$ and $H_2$. The value for CO and $N_2$ are the sums of vibrational cross sections for the first 8 individual states of CO and $N_2$. The values for $H_2$ is the cross section for excitation of the first vibrational level of $H_2$ multiplied by 1.4 to correct for angular distribution effects on the measured magnitude of the cross section. The electron impact ionization cross sections, $\sigma_i$ for $SF_6$, CO, $N_2$ and $H_2$ are also shown in FIG. 4. It is of primary importance that most electrons are captured or slowed down before reaching the ionization energy region of the medium. The attachment and inelastic cross sections should extend over a broad range of energies to provide for non-uniform fields.

The study of hydrocarbons has shown that certain molecular structures and substituents lower the position of negative ion resonances and in a fluorocarbon context this lowering would shift the inelastic interaction cross sections to lower energy levels thereby resulting in an electron energy distribution which would tend to maximize the effectiveness of the fluorocarbons for attaching electrons. In general, molecular structures having a first NIR at below about 4 eV in hydrocarbons are expected to be beneficial in gaseous dielectric components. The presence of a double bond is seen to lower the position of the negative ion resonance and the presence of an additional double bond further lowers the position of the negative ion resonance. This lowering is a function of the distance between the two bonds, with bonds closer together lowering the position to a lesser extent than bonds further apart in the molecule. It is also evident from hydrocarbon data that the replacement of a hydrogen atom by a methyl group raises the negative ion resonance position for aromatic molecules. It appears that the negative ion resonance positions is raised when an electron donating group is added to the ring. For both aliphatic and aromatic molecules, replacement of a hydrogen atom by an electron withdrawing group or a halogen lowers the position of a negative ion resonance and this lowering increases with the number of halogens or electron withdrawing groups so that eventually long-lived parent negative ions can form. It can thus be concluded that by changing the number and position of double bond and especially by changing the number and nature of substituents to basis hydrocarbon structures, negative ion resonances can be positioned at will in the subexcitation range.

These theories are borne out by the observed behavior of the perfluorocarbons presented herein. It is shown that $c$-$C_4F_8$ and iso-$C_4F_8$ as well as $C_4F_6$, $C_6F_{10}$ and $C_6F_{12}$ have significantly higher breakdown strength than does $SF_6$ and that this breakdown strength is due to their large attachment cross sections at substantially higher energy than $SF_6$. The superior breakdown strength of these five compounds compared with $SF_6$ clearly indicates that effective electron attachment in the energy range from 0.5–1.5 eV is very significant in controlling breakdown. It is seen from FIG. 4 that a much larger fraction of electrons in argon or $N_2$ will have energies 0.5–2 eV at pre-breakdown E/P values than in the region less than 0.4 eV where the cross section for $SF_6$ is substantial. These energy distribution functions are not expected to differ substantially for different gases.

It has additionally been found, according to this invention that $C_6F_6$ (hexafluorobenzene) is an effective synergistic additive to electron attaching gases. Binary mixtures of $C_6F_6$ with $c$-$C_4F_6$ with $c$-$C_4F_8$ and $SF_6$ have a higher breakdown voltage respectively than pure $c$-$C_4F_8$ and $SF_6$. The electron attachment cross section as a function of electron energy for $C_6F_6$ extends to higher energies than that of either $c$-$C_4F_8$ or $SF_6$. The correlation of negative ion resonances and electrical breakdown is clearly illustrated by comparing the data in Table IV with FIG. 4. The position of the negative ion resonances decreases in the order CO < $N_2$ < $H_2$. The magnitude of the scattering cross section, the momentum transfer cross section, and the total electron scattering cross section decrease in the reverse order. Comparing this with the data in Table IV shows the direct effect of the inelastic properties of the gas via NIR in the subexcitation energy range, especially about 1 to bout 4 eV, on the breakdown. The higher these cross sections are, the better the breakdown strength.

The fundamental physicochemical data obtained according to this invention indicates that hexafluoroazomethane, $F_3C-N=N-CF_3$, should be useful as a dielectric gas or as an additive with other gases having high electron capture cross sections. Hexafluoroazomethane is expected to be a superior dielectric component by virtue of its fluorine atoms and double bond. The fluorine atoms lower the energy position of the negative ion resonances and the double bond enhance the electron scattering cross section. Like the perfluorocarbons of this invention, hexafluoroazomethane can be used in combination with moderating gases and other high attachment cross section gases.

All of the gases and gaseous mixtures can be employed at customary total insulating pressures, e.g., 3-4 atm. An unexpected advantage associated with the use of hexafluoro-2-butyne is that dissociation products are formed with a much lower yield (<0.5%) of the parent ion under electron impact. This is particularly advantageous since it indicates that this gas would not decompose easily under electrical stress or with time. $SF_6$ forms highly toxic $SF_4$ and other toxic products under electrical stress.

Based upon the demonstrated dependence of electrical breakdown resistance on the electron attachment and inelastic scattering properties of dielectric gases and their relationship to molecular structure, it will be possible for workers in this art to select a number of gaseous components and mixtures having high ($\gtrsim 10^{-16}$ cm$^2$) electron attachment cross sections in the 0–1.3 eV range and high inelastic scattering cross sections in the 1 to ~4 eV range, and such components and mixtures are to be considered equivalents of the particular compounds and components described herein.

TABLE IV

Breakdown Strengths of $N_2$, CO, $H_2$, and Binary Mixtures of These with $C_4F_6$

| $C_4F_6$ (%) | $N_2$ (%) | CO (%) | $H_2$ (%) | Pd (atm – mm) | $V_s$ (kV) | $\Delta V_s/\Delta(Pd)$ (kV/atm – mm) |
|---|---|---|---|---|---|---|
| 100 | — | — | — | — | — | 17.5 |
| — | 100 | — | — | 2.04 | 7.54 | } 2.97 |
| — | 100 | — | — | 3.05 | 10.54 | |
| — | — | 100 | — | 2.03 | 9.24 | } 3.5 |
| — | — | 100 | — | 3.05 | 12.81 | |
| — | — | — | 100 | 2.04 | 4.30 | } 1.66 |
| — | — | — | 100 | 3.05 | 5.98 | |
| 33.33 | 66.66 | — | — | 2.04 | 18.69 | } 9.00 (7.81)* |
| 33.33 | 66.66 | — | — | 3.05 | 27.78 | |
| 33.33 | — | 66.66 | — | 2.04 | 20.90 | } 10.08 (8.16)* |
| 33.33 | — | 66.66 | — | 3.05 | 31.08 | |
| 33.33 | — | — | 66.66 | 2.03 | 18.72 | } 7.62 (6.93)* |
| 33.33 | — | — | 66.66 | 3.05 | 26.49 | |

*Predicted $\frac{\Delta V_s}{\Delta(Pd)}$ absent synergism

What is claimed is:

1. A method for designing a multicomponent gaseous insulator comprising determining the attachment cross section of candidate gases for electrons having energies in the range of 0–1.3 eV; selecting as a first component a gas having an electron attachment cross section greater than $10^{-16}$ cm$^2$; selecting as a second comonent a gas from the group of $N_2$, $H_2$, CO and $CO_2$; and mixing said first and second components.

* * * * *